United States Patent
Chevrel et al.

(10) Patent No.: US 9,795,927 B2
(45) Date of Patent: Oct. 24, 2017

(54) MANUFACTURING CARBON MOLECULAR SIEVE MEMBRANES USING A PYROLYSIS ATMOSPHERE COMPRISING SULFUR-CONTAINING COMPOUNDS

(71) Applicant: L'Air Liquide, Societe Anonyme pour l'Etude et l'Exploitation des Procedes Georges Claude, Paris (FR)

(72) Inventors: Henri Chevrel, Bryn Mawr, PA (US); Benjamin J. Jurcik, Jr., Landerberg, PA (US); Philippe A. Coignet, Bear, DE (US); Raja Swaidan, Bear, DE (US); Dean W. Kratzer, Warwick, MD (US)

(73) Assignee: L'Air Liquide Société Anonyme Pour L'Étude Et L'Exploitation Des Procedes Georges, Paris (FR)

( * ) Notice: Subject to any disclaimer, the term of this patent is extended or adjusted under 35 U.S.C. 154(b) by 0 days.

(21) Appl. No.: 14/972,980

(22) Filed: Dec. 17, 2015

(65) Prior Publication Data

US 2016/0184775 A1 Jun. 30, 2016

Related U.S. Application Data

(63) Continuation-in-part of application No. 14/725,987, filed on May 29, 2015.

(60) Provisional application No. 62/099,122, filed on Dec. 31, 2014.

(51) Int. Cl.
| | |
|---|---|
| *B01D 67/00* | (2006.01) |
| *B01D 53/22* | (2006.01) |
| *B01D 71/02* | (2006.01) |
| *B01D 69/08* | (2006.01) |

(52) U.S. Cl.
CPC ....... *B01D 67/0067* (2013.01); *B01D 53/228* (2013.01); *B01D 69/08* (2013.01); *B01D 71/021* (2013.01); *B01D 2256/12* (2013.01); *B01D 2256/16* (2013.01); *B01D 2256/245* (2013.01); *B01D 2257/102* (2013.01); *B01D 2323/10* (2013.01); *B01D 2325/10* (2013.01)

(58) Field of Classification Search
CPC B01D 53/228; B01D 67/0067; B01D 71/021; B01D 71/64; B01D 2323/50; B29C 35/00
See application file for complete search history.

(56) References Cited

U.S. PATENT DOCUMENTS

| | | | |
|---|---|---|---|
| 4,127,625 A | 11/1978 | Arisaka et al. | |
| 5,089,135 A * | 2/1992 | Yoneyama | B01D 67/0067 210/500.23 |
| 5,288,304 A * | 2/1994 | Koros | B01D 53/228 95/45 |
| 6,565,631 B2 | 5/2003 | Koros et al. | |
| 2006/0159718 A1* | 7/2006 | Rathenow | B01D 71/021 424/422 |
| 2007/0003749 A1* | 1/2007 | Asgari | A61L 27/34 428/304.4 |
| 2011/0100211 A1* | 5/2011 | Kiyono | B01D 53/228 95/45 |

OTHER PUBLICATIONS

Campo et al., Carbon molecular sieve membranes from cellophane paper, Journal of Membrane Science 350 (2010) 180-188.
Geiszler et al., Effect of polyimide pyrolysis conditions on carbon molecular sieve membrane properties, Ind. Eng. Chem. Res. 1996, 35, 2999-3003.
Fu et al., Carbon molecular sieve membrane structure—property relationships for four novel 6FDA based polyimide precursors, Journal of Membrane Science, 487 (2015) 60-73.
Hayashi et al., Effect of Oxidation on Gas Permeation of Carbon Molecular Sieving Membranes Based on BPDA-pp'ODA Polyimide, Ind. Eng. Chem. Res. 1997, 36, 2134-2140.
Robeson, L.M., The upper bound revisited, Journal of Membrane Science 320, (2008) 390-400.
Su et al., Effects of carbonisation atmosphere on the structural characteristics and transport properties of carbon membranes prepared from Kapton polyimide, Journal of Membrane Science 305 (2007) 263-270.
Saufi, et al, Fabrication of carbon membranes for gas separation—a review, Carbon 42 (2004) 241-259.
Kiyono et al., Effect of pyrolysis atmosphere on separation performance of carbon molecular sieve membranes, Journal of Membrane Science 359 (2010) 2-10.
He, et al., Structural, kinetic and performance characterization of hollow fiber carbon membranes, Journal of Membrane Science 390-391 (2012) 23-31.
Ismail, et al, Chapter 3: From Polymeric Precursors to Hollow Fiber Carbon and Ceramic Membranes, Membrane Science and Technology, 13 (2008) 89-119, Elsevier B.V.
Hagg, et al, Chapter 15: Carbon Molecular Sieve Membranes for Gas Separation, Membrane Engineering for the Treatment of Gases, 2 (2011) 162-191, Gas-separation Problems Combined with Membrane Reactors, Royal Society of Chemistry.

* cited by examiner

*Primary Examiner* — Jason M Greene
(74) *Attorney, Agent, or Firm* — Christopher J. Cronin

(57) ABSTRACT

A carbon molecular sieve (CMS) membrane is made by pyrolyzing a polymeric precursor membrane in a pyrolysis atmosphere containing a sulfur-containing compound.

7 Claims, No Drawings

MANUFACTURING CARBON MOLECULAR SIEVE MEMBRANES USING A PYROLYSIS ATMOSPHERE COMPRISING SULFUR-CONTAINING COMPOUNDS

CROSS-REFERENCE TO RELATED APPLICATIONS

This application is a continuation-in-part of U.S. Non-Provisional patent application Ser. No. 14/725,987, filed May 29, 2015, which claims the benefit of priority under 35 U.S.C. §119 (e) to U.S. Provisional Patent Application No. 62/099,122, filed Dec. 31, 2014, the entire contents of which are incorporated herein by reference.

BACKGROUND

Field of the Invention

The present invention relates to carbon molecular sieve membranes and gas separations utilizing the same.

Related Art

Membranes are often preferred to other gas separation techniques in industry due to the following advantages. The energy consumption for membranes is low as they do not require a phase change for separation. Membrane modules are compact, thereby reducing their footprint and capital cost. Membranes are also mechanically robust and reliable because they have no moving parts.

Polymer membranes in particular are used in a wide variety of industrial applications. They enable the production of enriched nitrogen from air. They separate hydrogen from other gases in refineries. They are also used to remove carbon dioxide from natural gas.

However, owing to the manufacturing processes and material structure, today's polymeric membranes cannot reach both high selectivities and permeabilities, because a trade-off exists between permeability and selectivity. Robeson formulated semi-empirical upper-bound trade-off lines for several gas pairs. (Robeson, "The upper bound revisited", Journal of Membrane Science 2008, vol 320, pp 390-400 (2008)).

Carbon molecular sieve (CMS) membranes have been shown to exceed the Robeson upper-bound and therefore are quite promising for use in gas separation membranes. CMS membranes are produced by pyrolyzing the precursor polymeric membranes to leave an amorphous carbon framework containing a network of micropores and ultramicropores. CMS membranes are considered molecular sieves because, when formed in an appropriate manner, the ultramicropores have dimensions that are sized to discriminate between pairs of gas molecules having similar kinetic diameters (such as O2/N2, CO2/N2, and CO2/CH4). In other words, slightly smaller gas molecules may be separated from slightly larger gas molecules by the presence of the appropriately sized ultramicropores.

Despite the very promising data shown so far, there still remains a need for CMS membranes exhibiting more satisfactory performance (i.e., permeabilities and selectivities for typical gases of interest). While some have proposed materials or techniques for producing CMS membranes having relatively high permeabilities, the selectivities for common gas pairs (such as $O_2/N_2$, $H_2/N_2$, $CO_2/CH_4$, $CO_2/N_2$, etc.) are not wholly satisfactory. Some have theorized that such CMS membranes are too porous. Conversely, while some have proposed materials or techniques for producing CMS membranes having relatively high selectivities, their permeabilities are similarly not wholly satisfactory. Some have theorized that such CMS membranes are too dense.

Some have proposed that the pyrolysis atmosphere may play a part in determining the result permeability or selectivity exhibited by a CMS membrane.

In particular, some have disclosed pyrolysis of precursor polymeric membrane under a $CO_2$ atmosphere but no discussion was made with regard to the effect of the $CO_2$ atmosphere upon the resultant CMS membrane. For example, Campo, et al. disclosed the pyrolysis of cellophane paper precursor membranes at various pyrolysis soak temperatures and soak times and under various pyrolysis atmospheres (Carbon molecular sieve membranes from cellophane paper, Journal of Membrane Science 350 (2010) 180-188). While cellophane paper membranes were pyrolyzed under 99.999% pure $N_2$, Ar, and $CO_2$, only the permeabilities and selectivities for the $N_2$ pyrolysis were reported. Therefore, no comparison between the effects of pyrolysis atmosphere composition upon the permeability and selectivity the resultant CMS membrane can be made.

Others have studied the pyrolysis of precursor polymeric membranes under vacuum and different types of inert gases. For example, Su, et al. disclosed the pyrolysis of Kapton polyimide membranes under vacuum, under Ar, under He, and under $N_2$ at different temperatures (Effects of carbonisation atmosphere on the structural characteristics and transport properties of carbon membranes prepared from Kapton® polyimide, Journal of Membrane Science 305 (2007) 263-270). They found that pyrolysis under He resulted in the highest BET surface area, total pore volume and micropore volume. They also found that the differences in permeance between the inert gas atmospheres were only significant at lower pyrolysis temperatures of 600° C. Moreover, they found that the highest ideal selectivity for $O_2/N_2$ (as opposed to mixed gas selectivity) was produced by pyrolysis under vacuum.

Still others have studied the pyrolysis of precursor polymeric membranes under vacuum and while being purged with inert gas, including Ar, He, and $CO_2$. Geiszler, et al. disclosed the pyrolysis of BPDA:6FDA/DAD under Ar, He, $CO_2$, and vacuum at varying soak temperatures and inert gas flow rates (Effect of polyimide pyrolysis conditions on carbon molecular sieve membrane properties, Industrial Engineering Chemical Research 35 (1996) 2999). They found that, for a given pyrolysis temperature, vacuum pyrolysis produced higher $O_2/N_2$ and $H_2/N_2$ selectivities than did pyrolysis carried out under an inert gas purge of Ar, He, or CO2. At a soak temperature of 550° C. and an inert gas purge flow rate of 200 $cm^3$(STP)/min, they found little difference in the $O_2$ flux and $O_2/N_2$ selectivity for membranes pyrolyzed with either an Ar, He, or $CO_2$ inert gas purge. They disclosed that $CO_2$ becomes more oxidative and pyrolyzed membranes with a $CO_2$ gas purge with an 800° C. soak temperature. While such pyrolysis conditions produced a CMS membrane having a relatively high flux of about 6500 GPU (gas production units), it exhibited a very poor $O_2/N_2$ selectivity of about 1.0.

Finally, others have also studied the oxidation of CMS membranes using either $O_2$ or $CO_2$. Hayashi, et al. disclosed the pyrolysis of precursor polymeric membranes under deoxygenated $N_2$ at 600-800° C. followed by oxidation with $N_2/O_2$ at 300° C. and pyrolysis of precursor polymeric membranes under deoxygenated $N_2$ at 900° C. followed by oxidation at the same temperature with $CO_2$ (Effect of Oxidation on Gas Permeation of Carbon Molecular Sieving Membranes Based on BPDA-pp'ODA Polyimide, Industrial Engineering Chemistry Research (1997), 36, 2134-2140).

Oxidation at 900 C for 1-3 hours resulted in either partial or total peeling of the membrane from the porous alumina support tube. Otherwise, $CO_2$ oxidation for 1 h at 800° C. or for 5 min at 900° C. had no effect on permeance. Additionally, excess oxidation abruptly expanded the pore size and decreased permselectivities for permeants larger than 0.4 nm. The researchers concluded that the control of micropore size was not achieved by $CO_2$ oxidation at 800-900° C.

Apart from the difficulty achieving an initially desirable performance, CMS membranes also exhibit performance degradation over time. This is believed to be caused by two mechanisms. The first mechanism is physical in nature. Similar to glassy polymers, the spacing between adjacent carbon chains tends to decrease over time due to relaxation as they approach an equilibrium state. As a result, permeance goes down and selectivity either remains the same or goes up. The second mechanism is chemical in nature. During use, gaseous species tend to chemiadsorb at active sites in or adjacent to ultramicropores. As a result, the ultramicropores is blocked by the adsorbed species, permeance goes down and selectivity either remains the same or goes up.

Fu, et al. have shown a reduction in the aging effect in CMS membranes after it has been continuously fed a mixed gas of 50% $CO_2$/50% $CH_4$ for a lengthy period of time (Carbon molecular sieve membrane structure-property relationships for four novel 6FDA based polyimide precursors, Journal of Membrane Science, 487, pp 60-73). While this result is interesting, it does not provide a practical solution to the problem of aging in CMS membranes where the gas to be separated is other than 50% $CO_2$/50% $CH_4$. Moreover, Fu, et al. do not propose any pyrolysis atmosphere for solving this problem.

In view of the above-described results and problems existing in CMS membranes, it remains unclear which pyrolysis atmosphere may predictably lead to a more satisfactory performance (such as permeance and selectivity) of a CMS membrane, both initially and over time.

Therefore it is another object of the invention to provide a CMS membrane (and method of making the same and method of using the same) that exhibits a more satisfactory performance than conventional CMS membranes.

SUMMARY

There is disclosed a method for producing a CMS membrane that comprises the following steps. A polymeric precursor membrane is formed. The polymeric precursor membrane is pyrolyzed in a pyrolysis atmosphere containing 5 ppm (vol/vol) to 50% (vol/vol) of a sulfur-containing compound in a balance of inert gas.

There is also disclosed the CMS membrane produced by the above-disclosed method.

There is also disclosed a method for separating a gas mixture that comprises the steps of feeding the gas mixture to the above-disclosed CMS membrane, withdrawing a permeate gas from a permeate outlet of the CMS membrane, and withdrawing a non-permeate gas from a non-permeate outlet of the CMS membrane that is deficient in at least one gas relative to the gas mixture.

Any of the method for producing, the CMS membrane, and the method for separating may include one or more of the following aspects:

the sulfur-containing compound is selected from the group consisting of $H_2S$, $H_2SO_4$, COS, $SO_2$, $SO_3$, $CS_2$, $SeS_2$, $Se_2S_6$, S, $SF_6$, and benzyl disulfide.

the balance gas is $N_2$, Ar or mixtures thereof.

the polymeric precursor membrane comprises a separation layer, the separation layer comprising 6FDA:BPDA/DAM.

the pyrolysis is conducted at a pressure of 0.25-1.0 bar (abs).

DESCRIPTION OF PREFERRED EMBODIMENTS

This disclosure describes a method of manufacturing carbon molecular sieve (CMS) membranes and in particular the pyrolysis step for transforming a precursor polymeric hollow fiber membrane into a CMS membrane using an atmosphere including sulfur-containing compounds that produces superior separation properties, high flux and stability.

During pyrolysis of a precursor hollow fiber, the pyrolysis chamber is purged with a pyrolysis gas atmosphere comprising an amount of a gaseous sulfur-containing compound in a balance of inert gas. Typical sulfur-containing compounds include $H_2S$, $H_2SO_4$, COS, $SO_2$, $SO_3$, $CS_2$, $SeS_2$, $Se_2S_6$, S, $SF_6$, and benzyl disulfide. The temperature in the pyrolysis chamber is increased and maintained according to a desired temperature ramp rate and/or soak temperature. The thus-pyrolyzed CMS membrane is allowed to cool.

Without being bound by any particular theory, we believe that COS reacts during the pyrolytic decomposition of the polymer and the departure of radicals from the pyrolyzing polymer according to the mechanism of Equation (1):

$$—C^*+2COS \rightarrow -2-C{=}S+CO_2 \quad (1)$$

We also believe that H2S similarly reacts according to the mechanism of Equation (2):

$$—C^*+2H_2S \rightarrow 2-C{=}S+2H_2 \quad (2)$$

We further believe that CS2 similarly reacts according to the mechanism of Equation (3):

$$—C^*+CS_2 \rightarrow 2-C{=}S \quad (3)$$

Finally, we believe that benzyl disulfide reacts with the pyrolyzing polymeric chain at oxygen atom-containing sites so as to displace the oxygen atom with a sulfur atom. For example, peroxide groups are replaced with persulfide groups, ether linkages are replaced with sulfide linkages, hydroxyl groups are replaced with sulfide linkages groups or sulfur dioxide groups, and carboxylic acids are replaced with sulfide linkages.

We further believe that the sulfur-containing compounds will react at active C—H sites or any other energy favorable sites on the surface of the developing carbon framework/matrix, such as at grain boundaries, the edges of graphite planes, and in micropores or ultramicropores. They form a stable non polar C$=$S bond that stabilizes the developing carbon framework/matrix and block some of the ultramicropores of the CMS membrane.

The invention provides at least a couple key advantages.

First, the —C$=$S block the porosity in a mechanical manner more efficiently than a —C$=$O bond. In the completed CMS membrane, the micropores (which are larger than the ultramicropores) allow adsorption of components in the feed gas and generally provide a path for the permeants through the membrane. The ultramicropores in the CMS membrane (which are much smaller than the micropores), on the other hand, are responsible for the molecular sieving behavior of the CMS membrane. During pyrolysis, the unpaired electrons (or, in the case of benzyl disulfide as the sulfur-containing compound, oxygen atoms) at developing micropores and ultramicropores react with the sulfur containing compound of the pyrolysis atmosphere. Without being bound by any particular theory, it is believed that the relatively longer C=S bond at 1.6 Å increases the spacing in between adjacent carbon chains and therefore increases permeance. This relatively longer bond length compares favorably with the relatively shorter carbon to carbon bond of 1.2 Å.

Second, the resultant functional group (including a C=S or C—S bond) is less electronegative than the active site before reaction with the sulfur-containing compound. This renders the CMS membrane less susceptible to the "aging effect" experienced in prior art CMS membranes in which polar molecules such as $H_2O$ or $CO_2$ chemiadsorb at the otherwise unreacted active sites. In other words, the very stable bond formed after reaction with the sulfur-containing compound is less apt to serve as a chemiadsorption site for polar molecules. Thus, the CMS membrane's performance is more stable over time.

The CMS hollow fiber membrane may be made as follows.

In the case of a monolithic precursor hollow fiber, one polymer solution (dope solution) is prepared. This dope solution comprises polymer dissolved in a solvent. In the case of a composite precursor hollow fiber having a thin sheath layer formed on a thick core, two polymer solutions (dope solutions) are prepared: a core dope solution and a sheath dope solution. The polymer of the sheath dope solution is selected for its separation performance (permeance and selectivity), while the polymer of the core dope solution is selected for over high flux. The core layer provides a strong substrate upon which the ultra-thin sheath layer is provided. The dope solution for the monolithic precursor hollow fibers or the core dope solution may also include a pore former such as $CaBr_2$.

Particular polymers useful for monolithic precursor fibers or for the polymer for the sheath dope solution are not limited. Indeed, any polymeric materials known as useful for forming a separation layer in the art of gas membrane separation may be used. Selection of an appropriate polymeric precursor material may be optimized based upon the particular gas separation at hand and the intrinsic permeance and selectivity characteristics of membranes formed from the precursor polymeric material. Suitable polymers include but are not limited to polyimides and polyaramids.

Non-limiting examples of suitable polyimide include those comprising alternating units of diamine-derived units and of dianhydride-derived units having the structure of formula I,

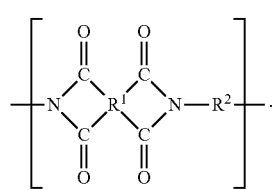
(I)

Each $R^1$ is a molecular segment independently selected from the group consisting of formula (A), formula (B), formula (C), and formula (D):

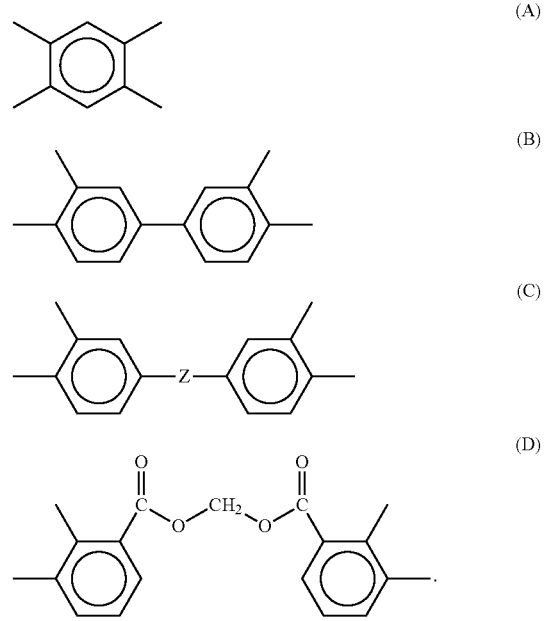

By independently selected, we mean that each $R^1$ need not be the same, however, typically it is. Z is a molecular segment independently selected from the group consisting of formula (e), formula (f), formula (g), (h), (i), (j), and (k):

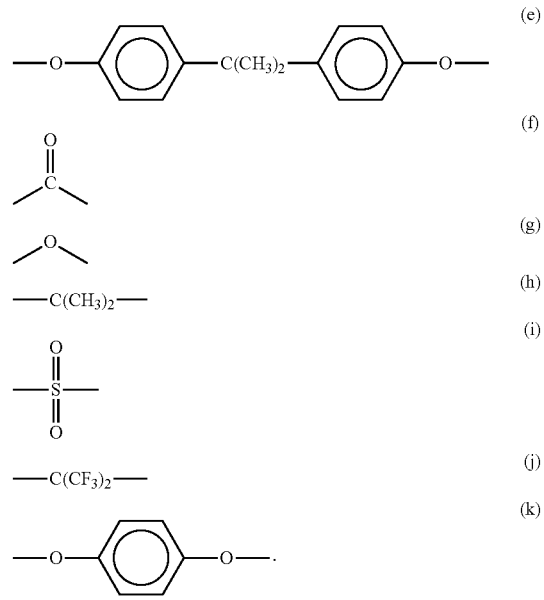

By independently selected, we mean that each Z need not be the same, however, typically it is. $R^2$ is a molecular segment derived from a diamine.

The $R^2$'s are molecular segments independently selected from the group consisting of formula (i), formula (ii), formula (iii), formula (iv), formula (v), formula (vi), formula (vii), formula (viii), formula (ix), formula (x), formula (xi), formula (xii), formula (xiii), formula (xiv), formula (xv), formula (xvi) and formula (xvii):

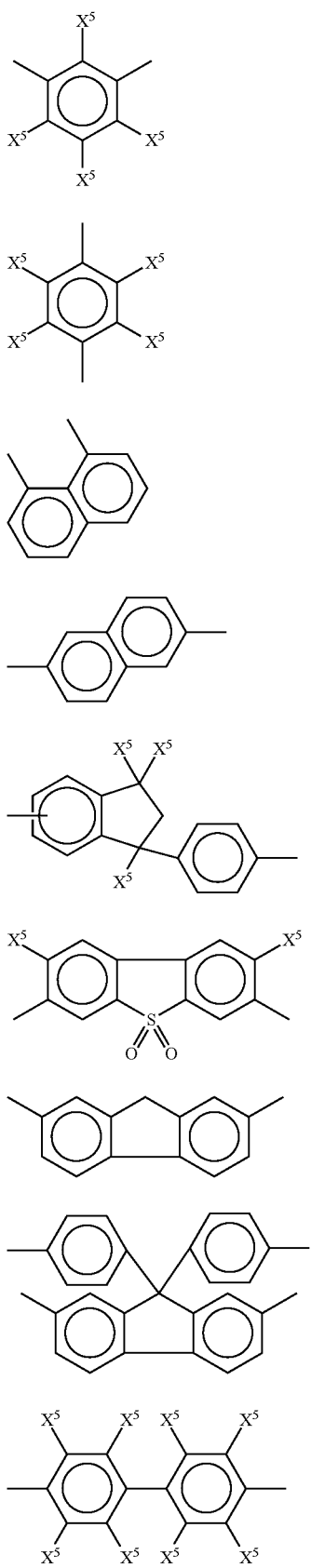

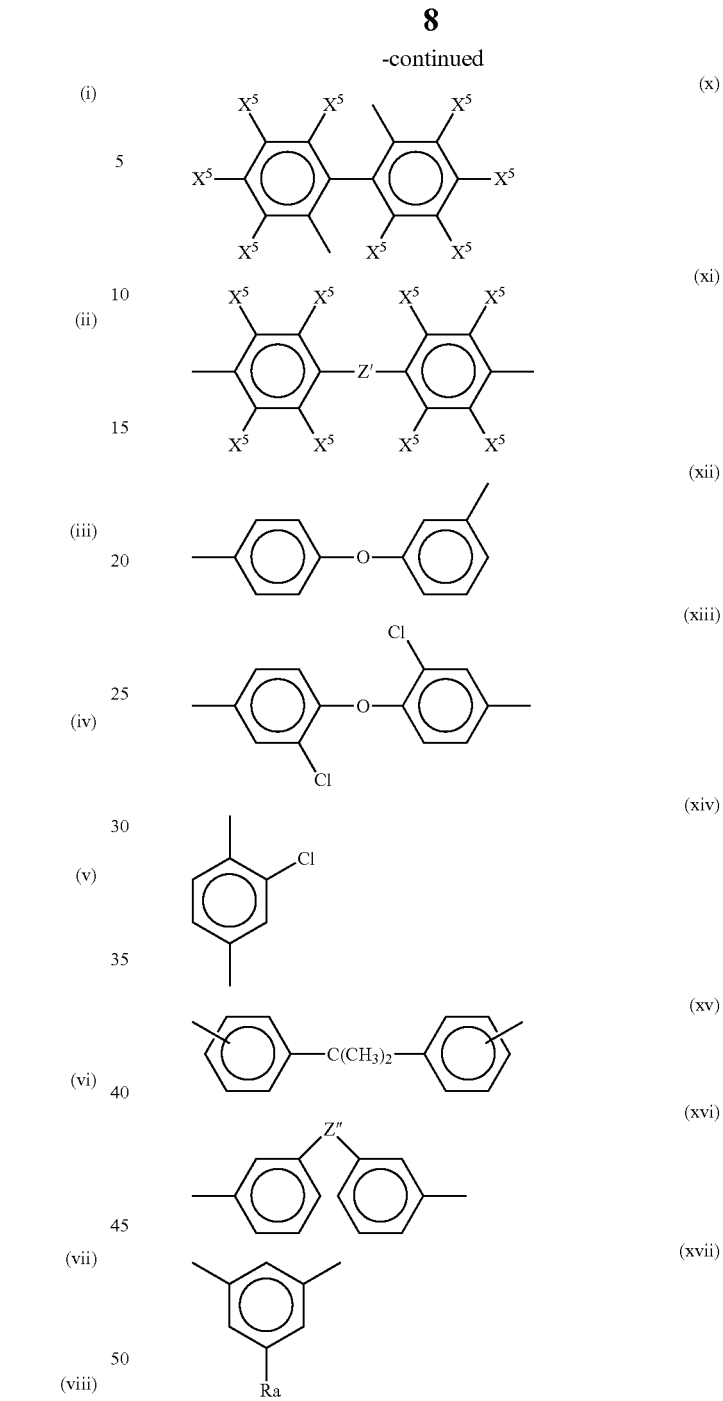

By independently selected, we mean that, each of those $R^2$'s need not be the same, however, typically they are. Each $X^5$ is independently selected from the group consisting of hydrogen, —Cl, —OCH$_3$, —OCH$_2$CH$_3$, and a straight or branched $C_1$ to $C_6$ alkyl group. Similarly, each of the $X^5$ need not be the same but typically they are. $R_a$ is a straight or branched $C_1$ to $C_6$ alkyl group having a terminal carboxylic acid group.

Each Z' is a molecular segment independently selected from the group consisting of the molecular segment of formula (xvii), formula (xviii), formula (xix), formula (xx), formula (xxi), formula (xxii), formula (xxiii), formula (xxiv), formula (xxv), formula (xxvi), formula (xxvii), formula (xxviii), formula (xxix), formula (xxxi), formula (xxxii), formula (xxxiii), formula (xxxiv), formula (xxxv), formula (xxxvi), formula (xxxvii), formula (xxxviii), formula (xxxix), and formula (xl):

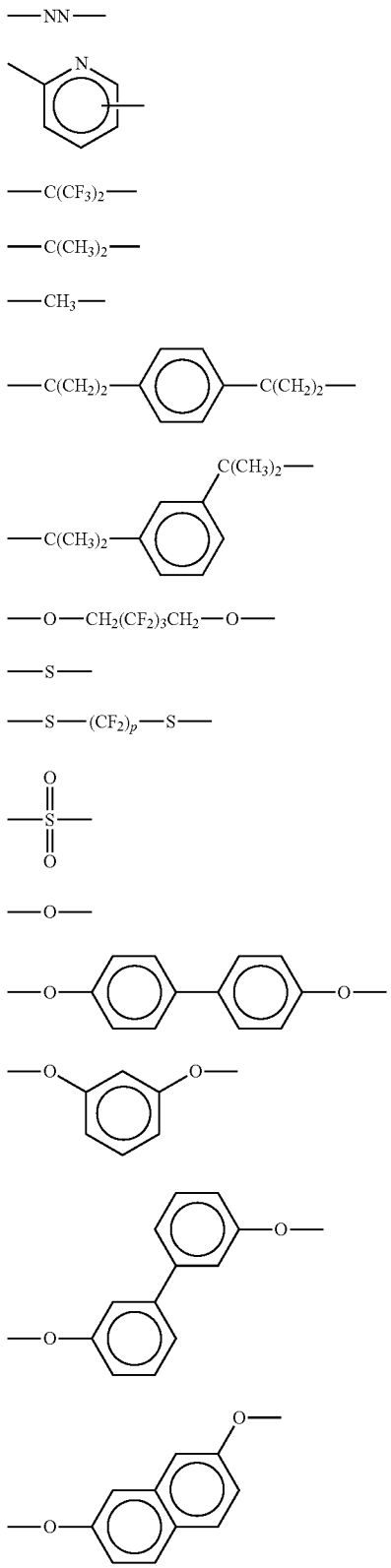
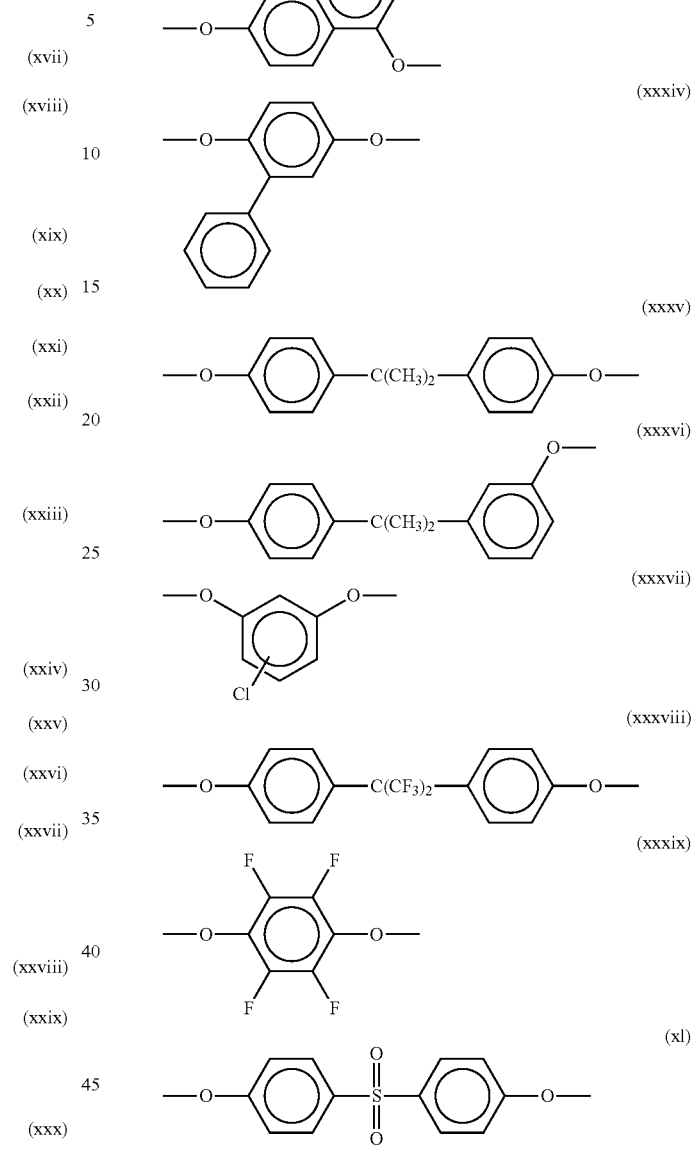

Subscript p is an integer from 1-10. Each Z″ is a molecular segment independently selected from the group consisting of the molecular segment of formula (xxvii), formula (xxviii), and formula (xl). By independently selected, we mean that each Z′ not need be the same but they typically are and each Z″ need not be the same but they typically are.

Typically, the polymer used in the dope solution for the monolithic fiber or in the sheath dope solution has a relatively higher glass transition temperature (Tg) in order to reduce the degree to which pores in the inner portion of the fiber collapse during pyrolysis, assuming that the membrane does not spend relatively much time above its Tg during pyrolysis. One such polymer is 6FDA:BPDA/DAM. 6FDA:BPDA/DAM, shown below, is a polyimide synthesized by thermal imidization from three monomers: 2,4,6-trimethyl-1,3-phenylene diamine (DAM), 2,2′-bis(3,4-dicarboxyphenyl hexafluoropropane) (6FDA), and 3,3′,4,4′-biphenyl tetracarbolic acid dianhydride (BPDA). 6FDA:BPDA/DAM is a polyimide made up repeating units of 6FDA/DAM and BPDA/DAM:

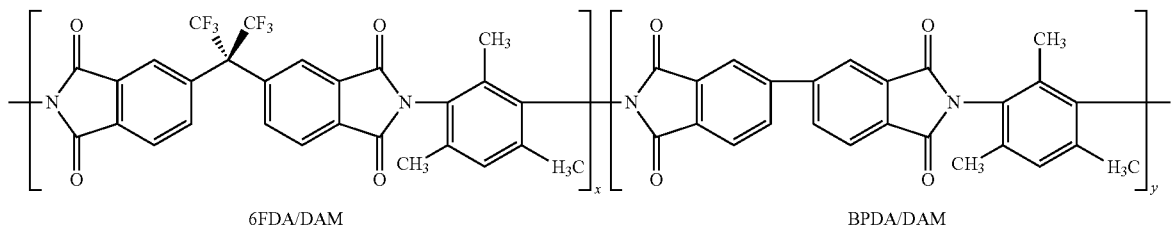

6FDA/DAM          BPDA/DAM

Another suitable polyimide is 6FDA/DETDA:DABA which is polymerized from the dianhydride 2,2'-bis(3,4-dicarboxyphenyl hexafluoropropane) (6FDA) and a mixture of the diamines 2,5-diethyl-6-methyl-1,3-diamino benzene (DETDA) and 3,5-diaminobenzoic acid (DABA).

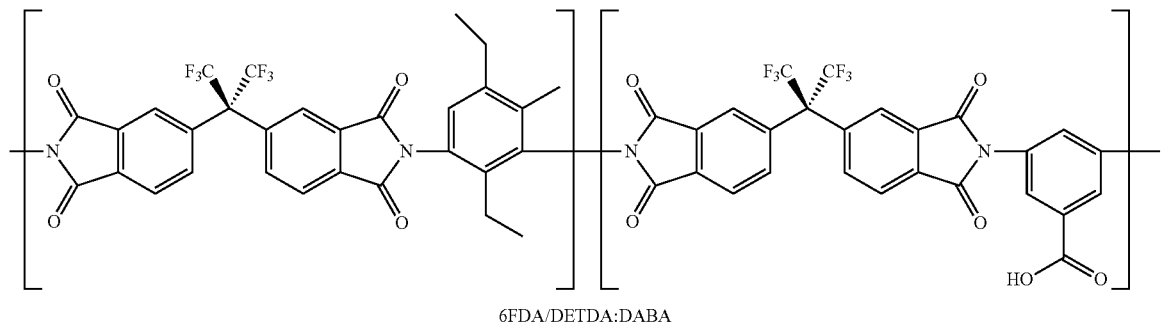

6FDA/DETDA:DABA

The polymer(s) of the first and second dope solutions may be optionally dried before dissolution in the associated solvent. The drying may be carried out in, for example, a drying vacuum oven, typically at a temperature ranging from 110-150° C. for at least 6 hours (and as much as 6-12 hours). Drying is considered to be completed once a steady weight is achieved. Other known methods of drying such as heating in an inert gas purge may additionally or alternatively be employed.

The solvent to be used in the preparation of the dope solution(s) should be a good solvent for the selected polymer and also compatible with the overall fiber spinning process. Solvents such as N-methylpyrrolidone (NMP), N,N-dimethylacetamide (DMAC), N,N-dimethylformamide (DMF), dichloromethane, tetrahydrofuran (THF), dimethyl sulfoxide (DMSO), gamma-butyrolactone (BLO) glycol ethers or esters, and others in which the resin is substantially soluble are particularly useful with the polymers of this invention. For purposes herein, "substantially soluble" means that at least 98 wt % of the polymer in the solution is solubilized in the solvent. To facilitate polymer dissolution, temperatures higher than ambient may be desirable.

Dissolution in, and homogenous distribution of, the polymer in the solvent may be enhanced by mixing with any known mixing device, including rollers, stirrer bars, and impellers. A mixing time of 6 hours to 30 days (optionally 3-10 days or even 3-7 days) will increase homogeneity which may help to reduce or eliminate defects in the precursor membrane.

The concentration(s) of the polymer(s) in the dope solutions is typically driven by the configuration of the precursor composite membrane (the green fiber before pyrolysis). Typically, the concentration will range from 12-35 wt % (or optionally 15-30 wt % or even 18-22 wt %).

The hollow fibers may be spun by any conventional method used to produce monolithic or composite sheath/core hollow fibers. A typical procedure is broadly outlined as follows. A bore fluid is fed through an inner annular channel of spinneret designed to form a cylindrical fluid stream positioned concentrically within the fibers during extrusion of the fibers. A number of different designs for hollow fiber extrusion spinnerets known in the art may be used. Suitable embodiments of hollow-fiber spinneret designs are disclosed in U.S. Pat. No. 4,127,625 and U.S. Pat. No. 5,799,960, the entire disclosures of which are hereby incorporated by reference. The bore fluid is preferably one of the solvents (for example, NMP) described above for use in the dope solutions, but a mixture of water and a solvent may be used as well.

In the case of monolithic precursor hollow fibers, the dope solution is fed through an annular channel of the spinneret surrounding the bore fluid. A nascent composite hollow fiber is obtained from the extrusion through the spinneret of the fed bore fluid and dope solution.

In the case of composite precursor hollow fibers, the core dope solution is fed through an intermediate annular channel of the spinneret surrounding the bore fluid and the sheath dope solution is fed through an outer annular channel of the spinneret surrounding the fed core dope solution. The nascent composite hollow fiber is obtained from the extrusion through the spinneret of the fed bore fluid and core and sheath dope solutions.

The diameter of the eventual solid polymeric precursor fiber is partly a function of the size of the hollow fiber spinnerets. The outside diameter of the spinneret annulus from which the dope solution (for monolithic fibers) or the core dope solution (for composite fibers) is extruded can be from about 400 μm to about 2000 μm, with a bore solution capillary-pin outside diameter from 200 μm to 1000 μm. The inside diameter of the bore solution capillary is determined by the manufacturing limits for the specific outside diameter of the pin. The temperature of the dope solution(s) during delivery to the spinneret and during spinning of the hollow fiber depends on various factors including the desired viscosity of the dispersion within the spinneret and the desired fiber properties. At higher temperature, viscosity of the dispersion will be lower, which may facilitate extrusion. At higher spinneret temperatures, solvent evaporation from the surface of the nascent fiber will be higher, which will impact the degree of asymmetry or anisotropy of the fiber wall. In general, the temperature is adjusted in order to obtain the desired viscosity of the dispersion and the desired degree of asymmetry of the fiber wall. Typically, the temperature is from about 20° C. to about 100° C., preferably from about 40° C. to about 80° C.

Upon extrusion from the spinneret, the nascent polymeric hollow fiber is passed through an air gap and immersed in a suitable liquid coagulant bath. In the air gap, an amount of the solvent from the extruded sheath dope solution evaporates and a solid polymeric skin layer is formed. The liquid coagulant bath facilitates phase inversion of the dissolved polyimide and solidification of the remaining portions of the precursor composite membrane structure. The coagulant constitutes a non-solvent or a poor solvent for the polymer(s) while at the same time a good solvent for the solvent(s) within the core and dope solutions. As a result, exchange of solvent and non-solvent from the fiber to the bath and vice-versa causes the remaining, inner portion of the nascent fiber (i.e., substantially the core) to form a two-phase sub-structure of solid polymer and liquid solvent/non-solvent as it is drawn through the liquid coagulant bath. Suitable liquid coagulants include water (with or without a water-soluble salt) and/or alcohol with or without other organic solvents. Typically, the liquid coagulant is water.

The concentration(s) of the polymer(s) and the relative amounts of the solvent(s) and non-solvent are selected so as to produce single phases in the dope solutions that are close to binodal. That way, as the extruded bore fluid and dope solution (in the case of monolithic hollow fibers) or the core and sheath dope solutions (in the case of composite hollow fibers) exit the spinneret and traverse through an air gap, solvent evaporating from the periphery of the dope solution (in the case of monolithic hollow fibers) or from the sheath dope solution (in the case of composite hollow fibers) causes the exterior of the extruded, outer dope solution (as the case may be) to vitrify, thereby forming an ultrathin, dense skin layer. The two-phase substructure of the remaining portions of the nascent fiber (i.e., substantially the core or the inner portion of the monolithic fibers) includes a matrix of polymer and pores that are filled with solvent(s) and non-solvent.

Typically, the solidified fiber is then withdrawn from the liquid coagulant bath and wound onto a rotating take-up roll, drum, spool, bobbin or other suitable conventional collection device. An aspect of the extruding, immersing, and winding steps includes controlling the ratio of solidified fiber windup rate to nascent fiber extrusion rate. This ratio is also sometimes called "draw ratio". One of ordinary skill in the art will recognize that the combination of spinneret dimensions and draw ratio serve to control the precursor fiber dimensions to the desired specifications.

Before or after collection, the fiber is optionally washed to remove any residual solvent(s) and non-solvent. After collection, the fiber is dried in order to remove any remaining solvent(s) or non-solvent). After the drying and optional washing steps, the pores that formerly containing solvent and non-solvent remain filled with the silica particles. Thus, an asymmetric, hollow precursor fiber is formed that comprises an ultrathin, dense skin over a thick core.

The completed precursor hollow fibers have an outer diameter that typically ranges from about 150-550 μm (optionally 200-300 μm) and an inner diameter that typically ranges from 75-275 μm (optionally 100-150 μm). In some cases unusually thin walls (for example, thicknesses less than 30 μm) may be desirable to maximize productivity while maintaining desirable durability. The desired final thickness of the CMS membrane sheath layer (after extrusion, drawing, and pyrolysis) can be achieved by selection of appropriate spinneret dimensions, draw ratios, and pyrolysis conditions to later result in sheath thicknesses as thin as 3-4 μm. The desired final thickness of the CMS membrane core layer can similarly be achieved through selection of appropriate values for the corresponding conditions.

The precursor composite hollow fibers are then at least partially, and optionally fully, pyrolyzed to form the final CMS membrane.

While any known device for pyrolyzing the membrane may be used, typically, the pyrolysis equipment includes a quartz tube within a furnace whose temperature is controlled with a temperature controller.

The interior of the pyrolysis chamber is purged with the inventive atmosphere which includes sulfur-containing compound within an inert gas of Ar, $N_2$, or mixtures thereof. The concentration of the sulfur-containing compound in the pyrolysis atmosphere may range from 5 ppm (vol/vol) to 90% (vol/vol). More typically, it may range from 5 ppm (vol/vol) to 50% (vol/vol). Typically, any pair of the following concentrations (in ppm vol/vol) may be used as the lower and upper ends of the concentration range: 900,000; 890,000; 880,000; 870,000; 860,000; 850,000; 840,000; 830,000; 820,000; 810,000; 800,000; 790,000; 780,000; 770,000; 760,000; 750,000; 740,000; 730,000; 720,000; 710,000; 700,000; 690,000; 680,000; 670,000; 660,000; 650,000; 640,000; 630,000; 620,000; 610,000; 600,000; 590,000; 580,000; 570,000; 560,000; 550,000; 540,000; 530,000; 520,000; 510,000; 500,000; 490,000; 480,000; 470,000; 460,000; 450,000; 440,000; 430,000; 420,000; 410,000; 400,000; 390,000; 380,000; 370,000; 360,000; 350,000; 340,000; 330,000; 320,000; 310,000; 300,000; 290,000; 280,000; 270,000; 260,000; 250,000; 240,000; 230,000; 220,000; 210,000; 200,000; 190,000; 180,000; 170,000; 160,000; 150,000; 140,000; 130,000; 120,000; 110,000; 100,000; 95,000; 90,000; 85,000; 80,000; 75,000; 70,000; 65,000; 60,000; 55,000; 50,000; 49,000; 48,000; 47,000; 46,000; 45,000; 44,000; 43,000; 42,000; 41,000; 40,000; 39,000; 38,000; 37,000; 36,000; 35,000; 34,000; 33,000; 32,000; 31,000; 30,000; 29,000; 28,000; 27,000; 26,000; 25,000; 24,000; 23,000; 22,000; 21,000; 20,000; 19,000; 18,000; 17,000; 16,000; 15,000; 14,000; 13,000; 12,000; 11,000; 10,000; 9,500; 9,000; 8,500; 8,000; 7,500; 7,000; 6,500; 6,000; 5,500; 5,000; 4,500; 4,000; 3,500; 3,000; 2,500; 2,400; 2,300; 2,200; 2,100; 2,000; 1,900; 1,800; 1,700; 1,600; 1,500; 1,400; 1,300; 1,200; 1,100; 1,000; 975; 950; 925; 900, 875; 850; 825; 800; 775; 750; 725; 700; 675; 650; 625; 600; 590; 580; 575; 570; 565; 560; 555; 550; 545; 540; 535; 530; 525; 520; 515; 510; 505; 500; 495, 490; 485; 480; 475; 470; 465; 460; 455; 450; 445; 440; 435; 430; 425; 420; 415; 410; 405; 400; 395; 390; 385; 380; 375; 370; 365; 360; 355; 350; 345; 340; 335; 330; 325; 320; 315; 310; 305; 300; 295; 290; 285; 280; 275; 270; 265; 260; 255; 250; 245; 240; 235; 230; 225; 225; 220; 215; 210; 200; 195; 190; 185; 180; 175; 170; 165; 160; 155; 150; 145; 140;

135; 130; 125; 120; 115; 110; 105; 100; 95; 90; 85; 80; 75; 70; 65; 60; 55; 50; 49; 48; 47; 46; 45; 44; 43; 42; 41 40; 39; 38; 37; 36; 35; 34; 33; 32; 31; 30; 29; 28; 27; 26; 25; 24; 23; 22; 21; 20; 19; 18; 17; 16; 15; 14; 13; 12; 11; 10; 9; 8; 7; 6; 5; 4; 3; 2; and 1.

Suitable sulfur-containing compounds which are gases at ambient temperature and pressure (i.e., ~22° C. (71.6° F.) and ~1 atm (14.7 psi)) include but are not limited to: $H_2S$, COS, $SO_2$, $SO_3$, $SF_6$, and benzyl disulfide. Gaseous sulfur-containing compounds (at ambient temperature/pressure) may be caused to be present in the pyrolysis atmosphere simply by premixing them with an inert gas and feeding the mixture to the pyrolysis chamber. Alternatively, these sulfur-containing compounds may be caused to be present in the pyrolysis atmosphere by mixing a stream of the sulfur-containing compound with a stream of the inert gas to provide a stream for feeding into the pyrolysis chamber. A suitable sulfur-containing compound which is a liquid at ambient temperature and pressure includes $CS_2$. A liquid sulfur-containing compound (at ambient temperature/pressure) may be caused to be present in the pyrolysis atmosphere simply by vaporizing it and mixing the vaporized compound in a stream of the inert gas for feeding into the pyrolysis chamber. Suitable sulfur-containing compounds which are solids at ambient temperature and pressure include but are not limited to: $SeS_2$, $Se_2S_6$, and S. Solid sulfur-containing compounds (at ambient temperature/pressure) may be caused to be present in the pyrolysis atmosphere simply by melting and vaporizing or by sublimating them and mixing the vaporized compound in a stream of the inert gas for feeding into the pyrolysis chamber. Finally, $H_2SO_4$ may be caused to be present in the pyrolysis atmosphere by nebulizing aqueous $H_2SO_4$ in a stream of the inert gas and feeding the mixture into the pyrolysis chamber.

The pressure inside the pyrolysis chamber may range from 0.10-1.0 bar (abs). Typically, it ranges from 0.25-0.50 bar (abs).

While the pyrolysis temperature may range from 500-1,000° C., typically it is between about 450-800° C. As two particular examples, the pyrolysis temperature may be 1,000° C. or more or it may be maintained between about 500-550° C. The pyrolysis includes at least one ramp step whereby the temperature is raised over a period of time from an initial temperature to a predetermined temperature at which the polymer is pyrolyzed and carbonized. The ramp rate may be constant or follow a curve. The pyrolysis may optionally include one or more pyrolysis soak steps (i.e., the pyrolysis temperature may be maintained at a particular level for a set period of time) in which case the soak period is typically between about 1-10 hours or optionally from about 2-8 or 4-6 hours.

An illustrative heating protocol may include starting at a first set point (i.e., the initial temperature) of about 50° C., then heating to a second set point of about 250° C. at a rate of about 3.3° C. per minute, then heating to a third set point of about 535° C. at a rate of about 3.85° C. per minute, and then a fourth set point of about 550° C. at a rate of about 0.25 degrees centigrade per minute. The fourth set point is then optionally maintained for the determined soak time. After the heating cycle is complete, the system is typically allowed to cool while still under vacuum or in the controlled atmosphere provided by purging with the low oxygen inert purge gas.

Another illustrative heating protocol (for final temperatures up to 550° C. has the following sequence: 1) ramp rate of 13.3° C./min from 50° C. to 250° C.; 2) ramp rate of 3.85° C./min from 250° C. to 15° C. below the final temperature ($T_{max}$); 3) ramp rate of 0.25° C./min from $T_{max}$–15° C. to $T_{max}$; 4) soak for 2 h at $T_{max}$.

Yet another illustrative heating protocol (for final temperatures of greater than 550° C. and no more than 800° C. has the following sequence: 1) ramp rate of 13.3° C./min from 50° C. to 250° C.; 2) ramp rate of 0.25° C./min from 250° C. to 535° C.; 3) ramp rate of 3.85° C./min from 535° C. to 550° C.; 4) ramp rate of 3.85° C./min from 550° C. to 15° C. below the final temperature $T_{max}$; 5) ramp rate of 0.25° C./min from 15° C. below the final temperature $T_{max}$ to $T_{max}$; 6) soak for 2 h at $T_{max}$.

Still another heating protocol is disclosed by U.S. Pat. No. 6,565,631. Its disclosure is incorporated herein by reference.

After the heating protocol is complete, the membrane is allowed to cool in place to at least 40° C.

While the inert gas may already have been doped with the sulfur-containing compound in order to achieve a concentration of the compound in the pyrolysis atmosphere, a pure or dilute (yet not as dilute as the final concentration in the pyrolysis atmosphere) sulfur-containing compound may be added to a line extending between a source of the inert gas and the pyrolysis chamber via a valve such as a micro needle valve. The flow rate of the pure or dilute sulfur-containing compound or the already-doped pyrolysis atmosphere gas may be controlled with a mass flow controller and optionally confirmed with a bubble flow meter before and after each pyrolysis process. Any analyzer suitable for measuring the concentration of the sulfur-containing compound in the pyrolysis atmosphere may be integrated with the pyrolysis chamber in order to monitor its concentration in the pyrolysis chamber. Between pyrolysis processes, the interior of the pyrolysis chamber may optionally be rinsed with acetone and baked in air at 800° C. to remove any deposited materials which could affect consecutive pyrolyses.

Following the pyrolysis step and allowing for any sufficient cooling, the gas separation module is assembled. The final membrane separation unit can comprise one or more membrane modules. These can be housed individually in pressure vessels or multiple modules can be mounted together in a common housing of appropriate diameter and length. A suitable number of pyrolyzed fibers are bundled to form a separation unit and are typically potted with a thermosetting resin within a cylindrical housing and cured to form a tubesheet. The number of fibers bundled together will depend on fiber diameters, lengths, and on desired throughput, equipment costs, and other engineering considerations understood by those of ordinary skill in the art. The fibers may be held together by any means known in the field. This assembly is typically disposed inside a pressure vessel such that one end of the fiber assembly extends to one end of the pressure vessel and the opposite end of the fiber assembly extends to the opposite end of the pressure vessel. The tubesheet and fiber assembly is then fixably or removably affixed to the pressure vessel by any conventional method to form a pressure tight seal. The final membrane separation unit includes a feed gas inlet, a permeate gas outlet, and a non-permeate (also known as residue or retentate) gas outlet.

For industrial use, a permeation cell or module made using the pyrolyzed CMS membrane fibers may be operated, as described in U.S. Pat. No. 6,565,631, e.g., as a shell-tube heat exchanger, where the feed is passed to either the shell or tube side at one end of the assembly and the product is removed from the other end. For maximizing high pressure performance, the feed is advantageously fed to the shell side of the assembly at a pressure of greater than about 10 bar, and alternatively at a pressure of greater than about 40 bar. The feed may be any gas having a component to be separated. Typically, the feed gas is natural gas, a mixture of an olefin and a paraffin (such as propane and propylene), or air.

In operation, the gas mixture to be separated/purified is fed to the CMS membrane. A permeate gas is withdrawn from the permeate outlet of the CMS membrane. A non-permeate gas is withdrawn from the non-permeate outlet that is deficient in at least one gas relative to the gas mixture. Depending upon whether a sweep is optionally used, the permeate gas may or may not be enriched in at least one gas relative to the gas mixture.

The described preparation of CMS membranes leads to an almost pure carbon material in the ultrathin dense film. Such materials are believed to have a highly aromatic structure comprising disordered $sp^2$ hybridized carbon sheet, a so-called "turbostratic" structure. The structure can be envisioned to comprise roughly parallel layers of condensed hexagonal rings with no long range three-dimensional crystalline order. Pores are formed from packing imperfections between microcrystalline regions in the material and their structure in CMS membranes is known to be slit-like. The CMS membrane typically exhibits a bimodal pore size distribution of micropores and ultramicropores—a morphology which is known to be responsible for the molecular sieving gas separation process.

The micropores are believed to provide adsorption sites, and ultramicropores are believed to act as molecular sieve sites. The ultramicropores are believed to be created at "kinks" in the carbon sheet, or from the edge of a carbon sheet. These sites have more reactive unpaired sigma electrons prone to reaction with the sulfur-containing compound than other sites in the membrane. Based on this fact, it is believed that by tuning the amount or concentration of the sulfur-containing compound in the pyrolysis atmosphere, the size of the selective ultramicropores and the distribution of micropores to ultramicropores can be tuned. It is also believed that tuning the concentration of the sulfur-containing compound results in a chemisorption process on the edge of the selective pore windows.

The pyrolysis temperature can also be tuned in conjunction with tuning the amount or concentration of sulfur-containing compound exposure. It is believed that lowering pyrolysis temperature produces a more open CMS structure. This can, therefore, make the doping process more effective in terms of increasing selectivity for challenging gas separations for intrinsically permeable polymer precursors. Therefore, by controlling the pyrolysis temperature and the concentration of the sulfur-containing compound, one can tune the sulfur-doping and, therefore, gas separation performance. In general, more sulfur-containing compound or a higher sulfur-containing compound concentration leads to larger spacing in between adjacent carbon chains and higher temperature leads to smaller pores.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for producing a CMS membrane, comprising the steps of:
    forming a polymeric precursor membrane; and
    pyrolyzing the polymeric precursor membrane in a pyrolysis atmosphere containing 5 ppm (vol/vol) to 50% (vol/vol) of $H_2S$ in a balance of inert gas.

2. The method of claim 1, wherein the balance gas is $N_2$, Ar or mixtures thereof.

3. The method of claim 1, wherein the polymeric precursor membrane comprises a separation layer, the separation layer comprising 6FDA:BPDA/DAM.

4. The method of claim 1, wherein the pyrolysis is conducted at a pressure of 0.25-1.0 bar (abs).

5. The method of claim 1, wherein the polymeric precursor membrane comprises a polyimide comprising alternating units of diamine-derived units and of dianhydride-derived units having the structure of formula I,

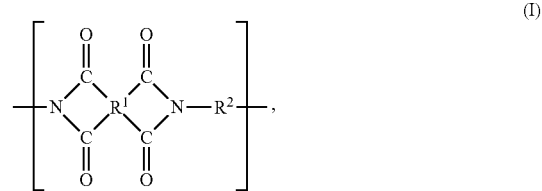

wherein:
    each $R^1$ is a molecular segment independently selected from the group consisting of formula (A), formula (B), formula (C), and formula (D):

(B)

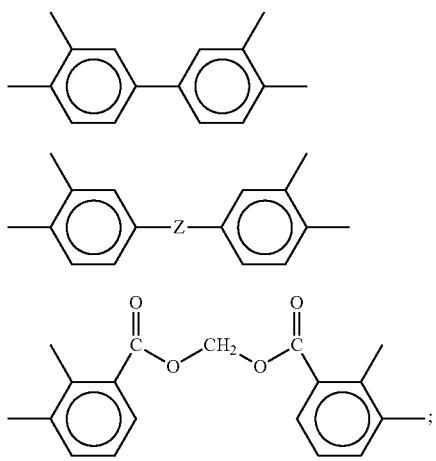

(C)

(D)

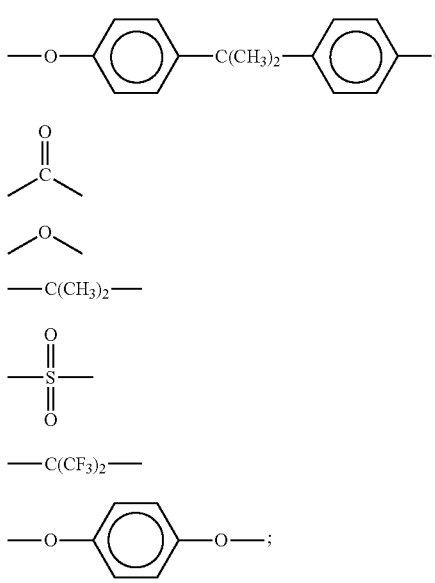

Z is a molecular segment independently selected from the group consisting of formula (e), formula (f), formula (g), (h), (i), (j), and (k):

—O—⟨ ⟩—C(CH$_3$)$_2$—⟨ ⟩—O— (e)

(f)

$$\underset{\text{O}}{\overset{\|}{C}}$$

(g)

—O—

—C(CH$_3$)$_2$— (h)

(i)

$$\underset{\text{O}}{\overset{\text{O}}{\underset{\|}{\overset{\|}{S}}}}$$

—C(CF$_3$)$_2$— (j)

—O—⟨ ⟩—O—; (k)

the R$^2$'s are molecular segments independently selected from the group consisting of formula (i), formula (ii), formula (iii), formula (iv), formula (v), formula (vi), formula (vii), formula (viii), formula (ix), formula (x), formula (xi), formula (xii), formula (xiii), formula (xiv), formula (xv), formula (xvi) and formula (xvii):

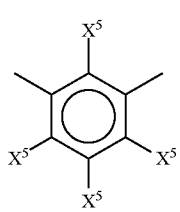
(i)

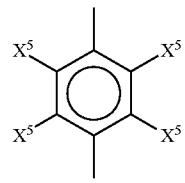
(ii)

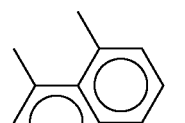
(iii)

(iv)

(v)

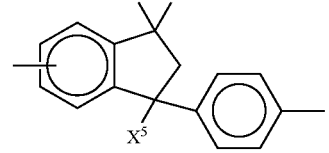
(vi)

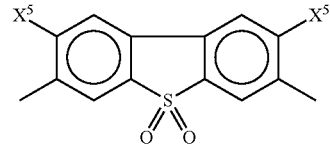
(vii)

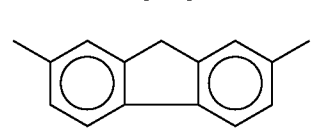
(viii)

(ix)

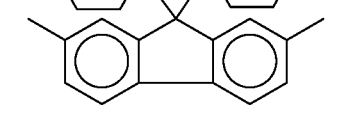
(x)

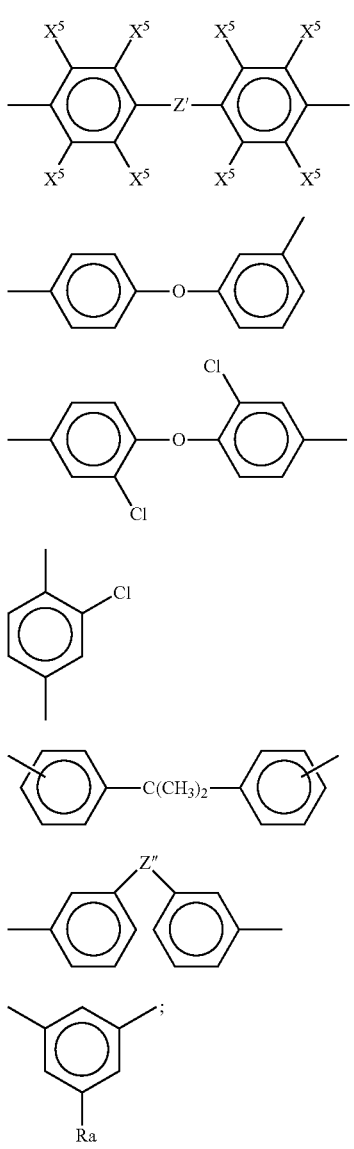
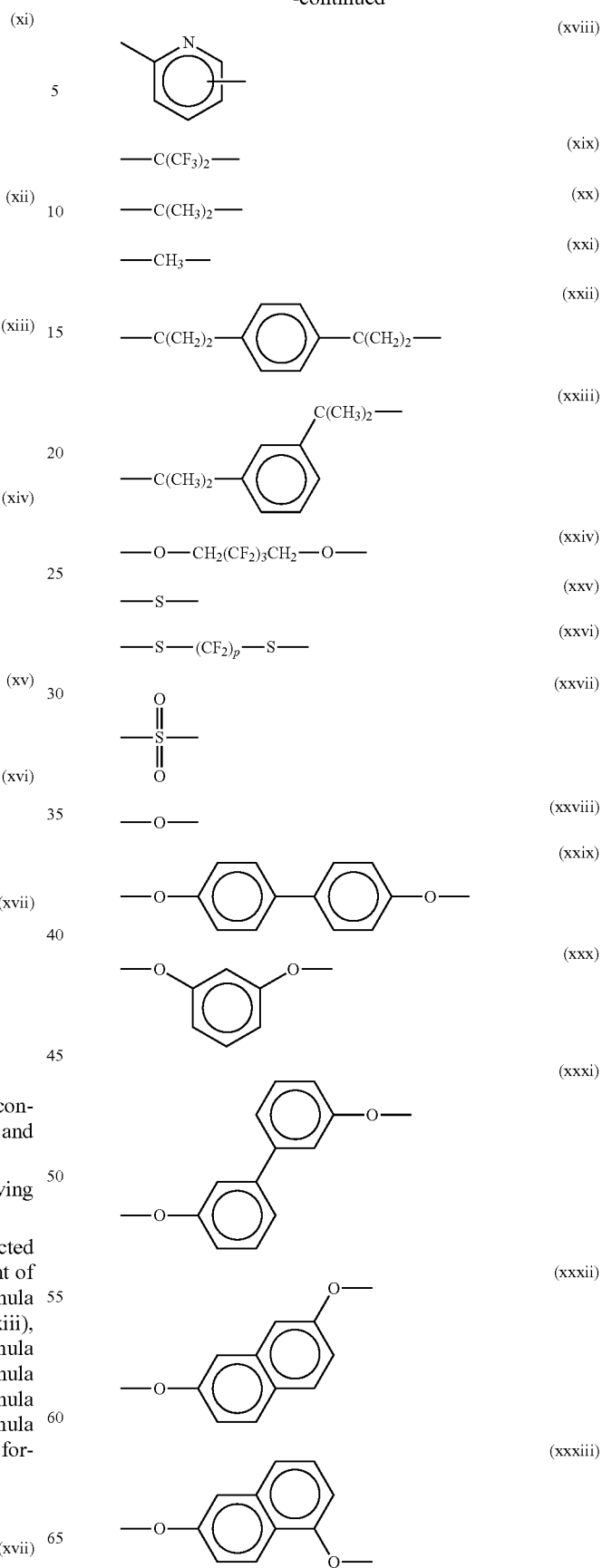

each $X^5$ is independently selected from the group consisting of hydrogen, —Cl, —OCH$_3$, —OCH$_2$CH$_3$, and a straight or branched C$_1$ to C$_6$ alkyl group;

R$_a$ is a straight or branched C$_1$ to C$_6$ alkyl group having a terminal carboxylic acid group;

each Z' is a molecular segment independently selected from the group consisting of the molecular segment of formula (xvii), formula (xviii), formula (xix), formula (xx), formula (xxi), formula (xxii), formula (xxiii), formula (xxiv), formula (xxv), formula (xxvi), formula (xxvii), formula (xxviii), formula (xxix), formula (xxxi), formula (xxxii), formula (xxxiii), formula (xxxiv), formula (xxxv), formula (xxxvi), formula (xxxvii), formula (xxxviii), formula (xxxix), and formula (xl):

—NN—  (xvii)

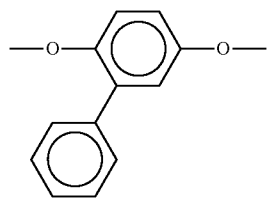 (xxxiv)

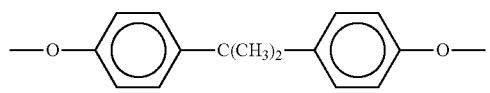 (xxxv)

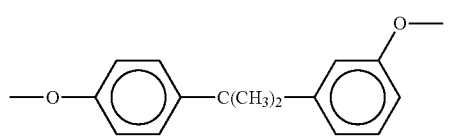 (xxxvi)

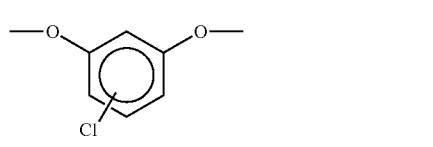 (xxxvii)

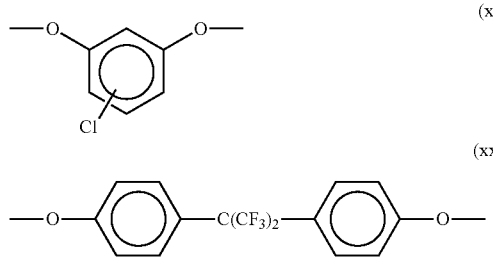 (xxxviii)

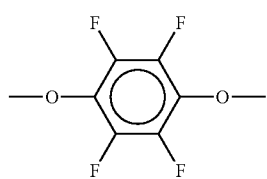 (xxxix)

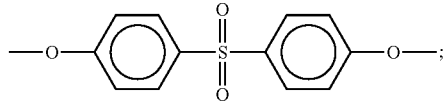 (xl)

subscript p is an integer from 1-10; and each Z" is a molecular segment independently selected from the group consisting of the molecular segment of formula (xxvii), formula (xxviii), and formula (xl).

6. A CMS membrane produced according to the method of claim 1.

7. A method for separating a gas mixture, comprising the steps of feeding the gas mixture to the CMS membrane of claim 6, withdrawing a permeate gas from a permeate outlet of the CMS membrane, and withdrawing a non-permeate gas from a non-permeate outlet of the CMS membrane that is deficient in at least one gas relative to the gas mixture.

* * * * *